United States Patent
Iyer Seshadri et al.

(10) Patent No.: US 9,742,599 B2
(45) Date of Patent: Aug. 22, 2017

(54) PARTIAL RESPONSE SIGNALING TECHNIQUES FOR SINGLE AND MULTI-CARRIER NONLINEAR SATELLITE SYSTEMS

(71) Applicant: Hughes Network Systems, LLC, Germantown, MD (US)

(72) Inventors: Rohit Iyer Seshadri, Gaithersburg, MD (US); Bassel F. Beidas, Alexandria, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 2 days.

(21) Appl. No.: 15/000,476

(22) Filed: Jan. 19, 2016

(65) Prior Publication Data

US 2017/0207934 A1 Jul. 20, 2017

(51) Int. Cl.
*H04L 25/03* (2006.01)
*H04L 27/20* (2006.01)

(52) U.S. Cl.
CPC .. *H04L 25/03834* (2013.01); *H04L 25/03006* (2013.01); *H04L 25/03847* (2013.01); *H04L 27/2017* (2013.01)

(58) Field of Classification Search
CPC .......... H04L 1/0048; H04L 25/03171; H04L 25/03821; H04L 25/067; H04L 27/2647;
(Continued)

(56) References Cited

U.S. PATENT DOCUMENTS 5,196,849 A * 3/1993 Galbraith ........... G11B 20/1426
341/59
5,432,818 A * 7/1995 Lou .................... H03H 21/0012
375/233
(Continued)

OTHER PUBLICATIONS

Improving the Spectral Efficiency of Nonlinear Satellite Systems through Time-Frequency Packing and Advanced Processing,Giulio Colavolpe et al, IEEE Intern. Conf. Commun. (ICC'12), Ottawa, Canada, Jun. 2012. pp. 1-8.*

*Primary Examiner* — Helene Tayong
(74) *Attorney, Agent, or Firm* — Sheppard Mullin; Daniel Yannuzzi; Jonathan Marina

(57) ABSTRACT

New partial response signaling systems and methods for high spectral efficiency communications are described. In a first implementation, a communication system includes a partial response signaling transmitter and a nonlinear satellite transponder. The partial response signaling transmitter includes a partial response transmit filter configured to convert complex-valued data symbols to a transmit signal using a partial response pulse shaping function; and a modulator configured to modulate the transmit signal onto a carrier wave. The transponder receives and non-linearly amplifies the modulated transmit signal for broadcast to receivers. In a second implementation, a receiver includes circuitry for downconverting a received input signal; a partial response filter with a partial response impulse function for filtering the downconverted signal; circuitry for downsampling the partial response filtered signal; circuitry for equalizing the downsampled signal; and a linear and non-linear interference cancellation module including circuitry for removing linear and non-linear ISI in the input signal.

20 Claims, 17 Drawing Sheets

(58) Field of Classification Search
CPC ............. H04L 27/2691; H04L 27/2695; H04L 25/03318
USPC .................................................. 375/295, 316
See application file for complete search history.

(56) References Cited

U.S. PATENT DOCUMENTS

| | | | | |
|---|---|---|---|---|
| 5,734,681 | A * | 3/1998 | Kaku | H04L 25/03343 375/265 |
| 6,377,529 | B1 * | 4/2002 | Lee | G11B 20/10009 369/53.33 |
| 2006/0245757 | A1 * | 11/2006 | Elahmadi et al. | H04B 10/2513 398/135 |
| 2007/0286317 | A1 * | 12/2007 | Stentiford | H04L 25/03012 375/348 |
| 2010/0017195 | A1 * | 1/2010 | Villemoes | H03H 17/0272 704/200.1 |
| 2012/0027070 | A1 * | 2/2012 | Beidas | H04L 1/0048 375/229 |
| 2013/0114648 | A1 * | 5/2013 | Bittner | H04W 24/02 375/211 |
| 2014/0146911 | A1 * | 5/2014 | Eliaz | H04B 1/16 375/285 |
| 2015/0280757 | A1 * | 10/2015 | Beidas | H04B 1/0475 375/296 |
| 2015/0311973 | A1 * | 10/2015 | Colavolpe | H04L 25/03171 370/317 |

* cited by examiner

PARTIAL RESPONSE SIGNALING TECHNIQUES FOR SINGLE AND MULTI-CARRIER NONLINEAR SATELLITE SYSTEMS

TECHNICAL FIELD

The present disclosure relates generally to satellite networks. More particularly, some embodiments of the present disclosure are directed toward systems and methods for providing partial response signaling for single and multi-carrier nonlinear satellite systems.

BACKGROUND

The ever increasing demand for high spectral efficiency spawned by a variety of next generation wireless services places considerable strains on modern satellite communication systems. Conventionally, signaling techniques relied on a set of transmission and reception filters that satisfied the Nyquist signaling criterion for ensuring inter-symbol interference (ISI) free reception. These conventional systems use root-raised cosine (RRC) filters that satisfy Nyquist's ISI free reception criteria. However, to achieve ISI free reception, Nyquist's criterion imposes constraints on the maximum symbol rate and signal power spectrum density.

As a consequence, there is an increasing interest in transmission techniques that introduce a certain amount of controlled ISI at the receiver. Examples of such techniques include Continuous Phase Modulation (CPM), Faster-than Nyquist (FTN) signaling and partial response signaling. All of these techniques seek to improve spectral efficiency by introducing a certain amount of controlled ISI at the receiver.

SUMMARY

In accordance with embodiments of the disclosed technology, new partial response signaling systems and methods for high spectral efficiency communications are described. In one embodiment of the disclosed technology, a communication system includes a partial response signaling transmitter and a nonlinear satellite transponder. The transmitter includes a partial response transmit filter configured to convert complex-valued data symbols to a transmit signal using a partial response pulse shaping function; and a modulator configured to modulate the transmit signal onto a carrier wave for transmission as a modulated transmit signal. The nonlinear satellite transponder receives the modulated transmit signal and includes a nonlinear amplifier for amplifying the modulated transmit signal to be broadcast to one or more receivers.

In particular implementations of the first embodiment, the pulse shaping function is given by $$p_T(t) = \sum_{l=0}^{L-1} f_l \cdot \text{sinc}\left(\frac{t - lT_s}{T_s}\right)$$

where L is an integer, single-sided memory span of the transmit filter, $T_s$ is the symbol duration, and $f_l$ is a coefficient associated with a memory l. In a specification implementation, L is 2 or 3.

In further embodiments, the transmitter includes: a second partial response transmit filter configured to convert a second set of complex-valued data symbols to a second transmit signal using a partial response pulse shaping function; a modulator configured to modulate the second transmit signal onto a second carrier wave for transmission as a second modulated transmit signal; and an adder configured to add the first and second modulated transmit signals to generate a composite signal. In implementations of these embodiments, the transponder receives the composite signal at an input multiplexing filter (IMUX), and the amplifier amplifies the first and second modulated transmit signals.

In yet further embodiments, the communication system includes a partial response signaling receiver that receives the broadcasted amplified modulated transmit signal, and applies partial response filtering to the received signal using a partial response receiver filter matched to the partial response transmit filter.

In another embodiment of the disclosed technology, a partial response signaling receiver includes circuitry for downconverting a received input signal; a partial response filter with a partial response impulse function for filtering the downconverted signal; a downsampler for downsampling the partial response filtered signal; a linear equalizer for equalizing the downsampled signal; and a linear and non-linear interference cancellation module comprising circuitry for removing linear inter-symbol interference (ISI) and non-linear ISI in the input signal.

In one implementations of the partial response signaling receiver, the received input signal is received from a satellite transponder including an IMUX and OMUX, and the linear equalizer compensates for the group delay resulting from the IMUX and OMUX. In another implementation of the partial response signaling receiver, the circuitry for removing linear and non-linear ISI includes an interference estimate filter configured to estimate interference in the input signal by creating a polynomial representation of a nonlinear satellite system with memory. In a particular implementation, the polynomial representation is based on the Volterra series.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, partial response signaling is a signaling technique that provides a compact signal power-spectrum at the expense of violating Nyquist's criterion for inter-symbol interference (ISI) free reception. It does so by introducing a certain amount of controlled ISI at the receiver. Various embodiments of the disclosed technology provide new partial response signaling systems and methods for high spectral efficiency communications in satellite systems. In various implementations, the disclosed partial response signaling systems and methods may be implemented in nonlinear satellite systems including an amplifier.

According to a first implementation of the disclosed technology, new partial response signaling transmit and receive filters that introduce a controlled amount of ISI are described. The disclosed partial response signaling filters may be tuned to adjust the created ISI to provide an optimal combination of a compact signal spectrum and signal channel capacity (i.e., rate at which information may be reliably transmitted). As will be further described below, embodiments of the disclosed partial response signaling filters are configured to create a signal with a lower peak to average power ratio (PAPR) than conventional RRC filters, thereby permitting a compact signal spectrum suitable for use with a satellite transponder.

In a second implementation of the disclosed technology, an innovative receiver for detecting a partial response signal in nonlinear channels is described. The disclosed receiver may be implemented in various embodiments to mitigate the linear signal distortion resulting from partial response filtering and the nonlinear signal distortion resulting from amplification of the transmitted signal. As will be further described below with reference to various embodiments, the complexity of the receiver is not exponential with the signal alphabet size or number of carriers, thereby permitting proper operation of a highly efficient satellite system in both power and bandwidth with manageable system complexity.

Figure 1A:
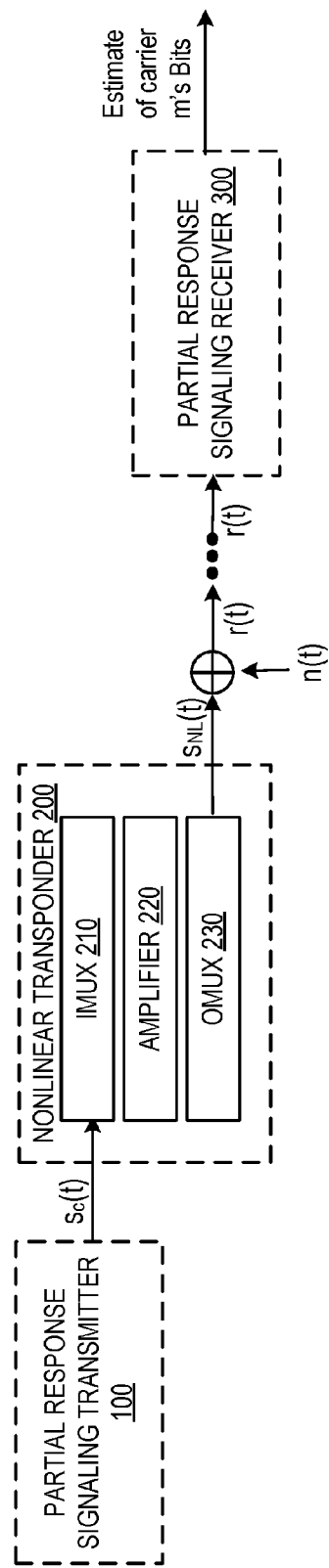
FIG. 1A illustrates an exemplary non-linear satellite communication system in which the disclosed technology may be implemented.
Figure 1B:
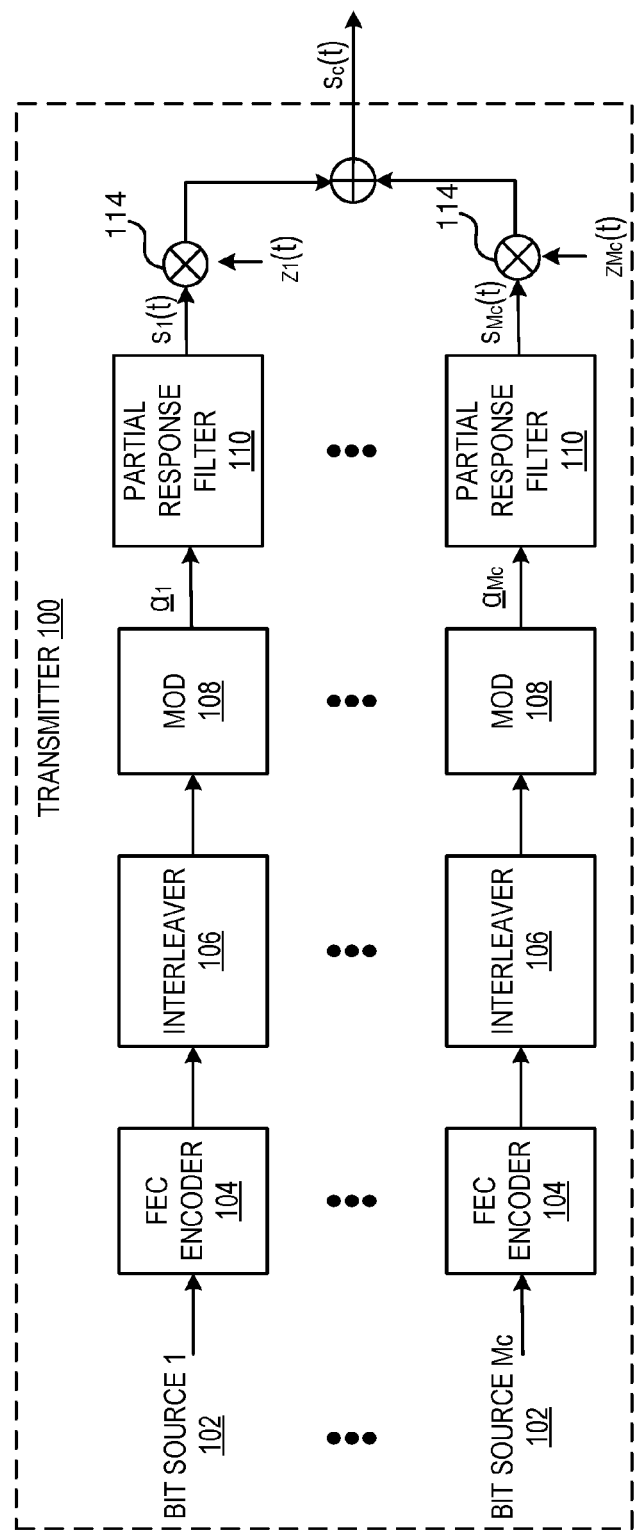
FIG. 1B illustrates an exemplary partial response signaling transmitter that may be implemented in the satellite communication system of FIG. 1A.

FIGS. 1A-1B illustrate an exemplary non-linear satellite communication system in which the disclosed technology may be implemented. As illustrated in FIG. 1A, one or more (m) independent carriers (1, . . . , $M_c$) may carry data signals ($s_1(t) \ldots s_{M_c}(t)$) over a satellite channel. The data signals are shaped at transmitter 100 (e.g., a transmitting base station) using partial response signaling. In various embodiments, the partial response data signals may carry image, video, audio, and other information, and are added to create composite signal $s_c(t)$ prior to transmission. A nonlinear satellite transponder 200 receives composite signal $s_c(t)$ from transmitter 100, and amplifies and rebroadcasts the partial response signal for reception by one or more receivers 300. In the exemplary communication environment of FIG. 1, receiver 300 is able to receive the partial response signal and mitigate the signal distortion resulting from partial response filtering and the nonlinear signal distortion resulting from amplification of the transmitted signal.

With reference now to FIG. 1B, in one exemplary embodiment the partial response signaling communication transmitter 100 includes, for each carrier (1, . . . , $M_c$), a bit source 102, a forward error correction (FEC) encoder 104, an interleaver 106, a modulator 108, a partial response filter 110, and a mixer 112. Although the components of transmitter 100 are shown in a particular order in this example, one of ordinary skill in the art reading this description will understand that the order of components can be varied and some components may be excluded. One of ordinary skill in the art will understand how other transmitter configurations can be implemented, and that one or more of these components can be implemented in either digital form (e.g., as software running on a DSP or other processing device, with the addition of a DAC) or as analog components.

Bit source 102 provides information bits to be transmitted to FEC encoder 104. The information can include, for example, images, video, audio, text and other data. FEC encoder 104 performs forward error correction by adding redundancy to information data bits signal 102. Forward error correction improves the capacity of a channel by adding redundant information to the data being transmitted through the channel. Examples of forward error correction codes that can be applied by FEC encoder 104 can include block codes (e.g., turbo codes, low-density parity check codes (LDPC), Reed-Solomon codes, Hamming codes, Hadamard codes, BCH codes, and so on), and convolutional codes.

Interleaver 106 scrambles the encoded data bits by rearranging the bit sequence order to make distortion at receiver 300 more independent from bit to bit. In other words, interleaver 106 rearranges the ordering of the data sequence in a one to one deterministic format. Interleaving may be used to enhance the performance of the forward error correcting codes. Modulator 108 modulates the interleaved bits using a bit-to-symbol modulation scheme to form complex-valued data symbols a. The interleaved bits may be modulated using any of a number of different modulation techniques. Examples of modulation schemes that can be implemented include Amplitude Phase Shift Keying (APSK), Quadrature Phase Shift Keying (QPSK), π/M-MPSK, other orders of Multiple Phase Shift Keying MPSK, Quadrature Amplitude Modulation (QAM), and so on.

Subsequently, partial response transmit filter 110 converts the complex-valued data symbols a to a waveform signal $s_m(t)$ using a partial response pulse shaping function with a partial response $p_T(t)$. In one mathematical implementation, the signal waveform at the output of the transmit pulse shaping filter for a particular carrier m may be expressed by Equation (1):

$$s_m(t) = \Sigma_k a_k p_{m,T}(t-kT_s); \; m=1, \ldots, M_c \quad (1)$$

Where $a_k$ is a given data symbol, $p_{m,T}(t)$ is the impulse response filter for a given carrier m, k is the summation constant, and $T_s$ is the symbol duration.

In traditional communication systems, $p_T(t)$ and its receiver counterpart $p_R(t)$ are a pair of root-raised cosine (RRC) filters and provide ISI free operation at the correct sampling instants in linear-AWGN channels. With various embodiments, however, partial response filters are used for the transmit filter $p_T(t)$ and its corresponding matched filter for the receive pulse shaping filter $p_R(t)$. As stated above, $s_m(t)$ generated using such partial response filters has a lower peak-to-average power ratio (PAPR) and a more compact spectrum than $s_m(t)$ generated using RRC filters.

In one exemplary embodiment, the partial response $p_T(t)$ of the partial response transmit filter 110 may be defined by Equation (2):

$$p_T(t) = \sum_{l=0}^{L-1} f_l \cdot \text{sinc}\left(\frac{t - lT_s}{T_s}\right) \quad (2)$$

where L, the single-sided memory span, and the coefficients $f_l$ are design parameters that can be selected to provide an optimum trade-off between spectral and power efficiency, for a particular transponder model. L is an integer, single-sided memory span of the transmit filter 110 referring to how many delayed synch pulses are added to obtain the transmit filter 110, $T_s$ is the symbol duration, and $f_l$ is a coefficient that is a design parameter that may be tuned to optimize the trade-off between spectral and energy efficiency for a particular transponder model 200.

In various embodiments, integer memory span L, which is a representation of the number of neighbors causing ISI on each side of a particular symbol integral, may be adjusted to control the amount of ISI that is introduced during signal transmission. More particularly, L may be adjusted upwards to increase the ISI and downwards to decrease the ISI. In other words, the greater the memory L, the more compact the signal spectrum, but the greater the ISI that needs to be corrected at receiver 300. In particular embodiments, the memory L of the partial response filters may be set to L=2 or L=3. However, it would be appreciated by a person having skill in the art that in alternative implementations L may be set to L>3.

In further embodiments, the coefficients $f_l$ may be adjusted by running capacity simulations that compare the signal spectrum and signal channel capacity for different sets of coefficients $f_l$. For example, signal channel capacity curves may be generated for different combinations of $f_l$, and the $f_l$ that provide acceptable signal channel capacity and the most compact signal spectrum may be selected. As would be understood by a person having skill in the art, such a selection of $f_l$ permits adjacent carriers to be placed closer together while avoiding interference, thereby permitting more carriers to be placed in the same bandwidth.

Figure 2:
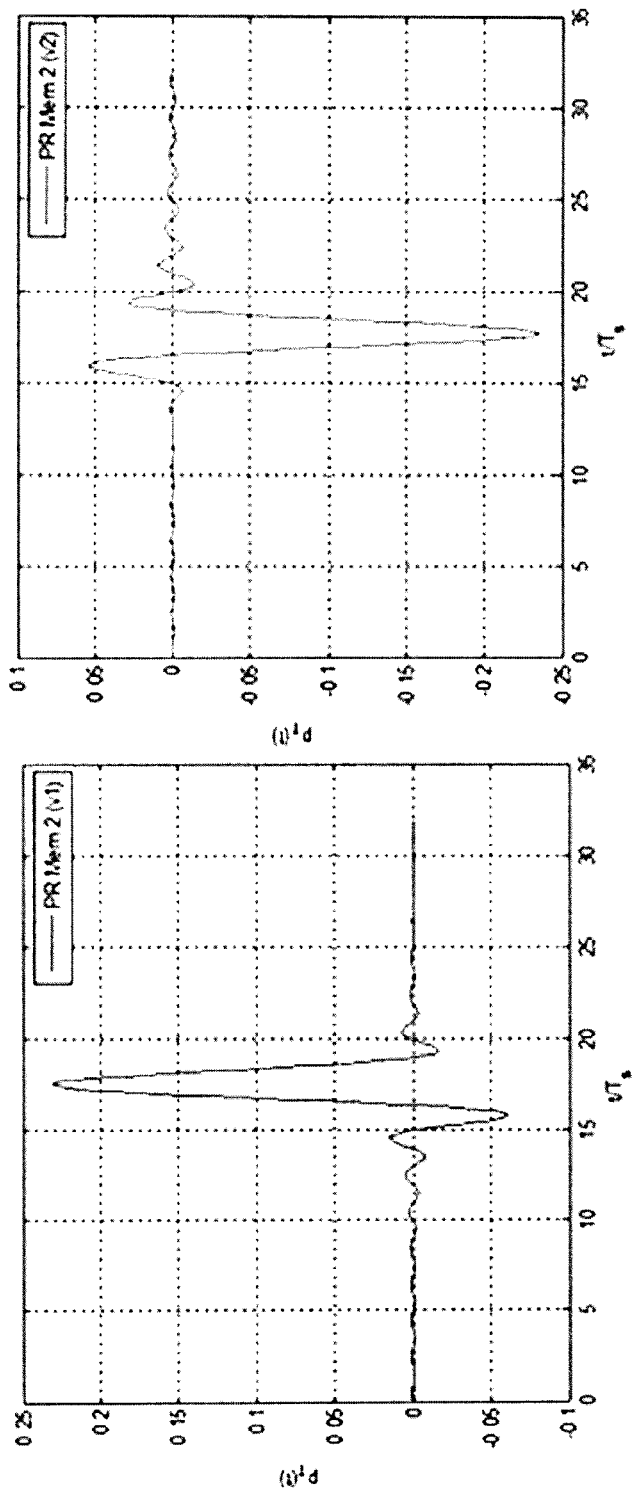
FIG. 2 shows two plots illustrating the impulse response of two example partial response transmit filters having a memory L=2 in accordance with example embodiments of the disclosed technology.
Figure 3A:
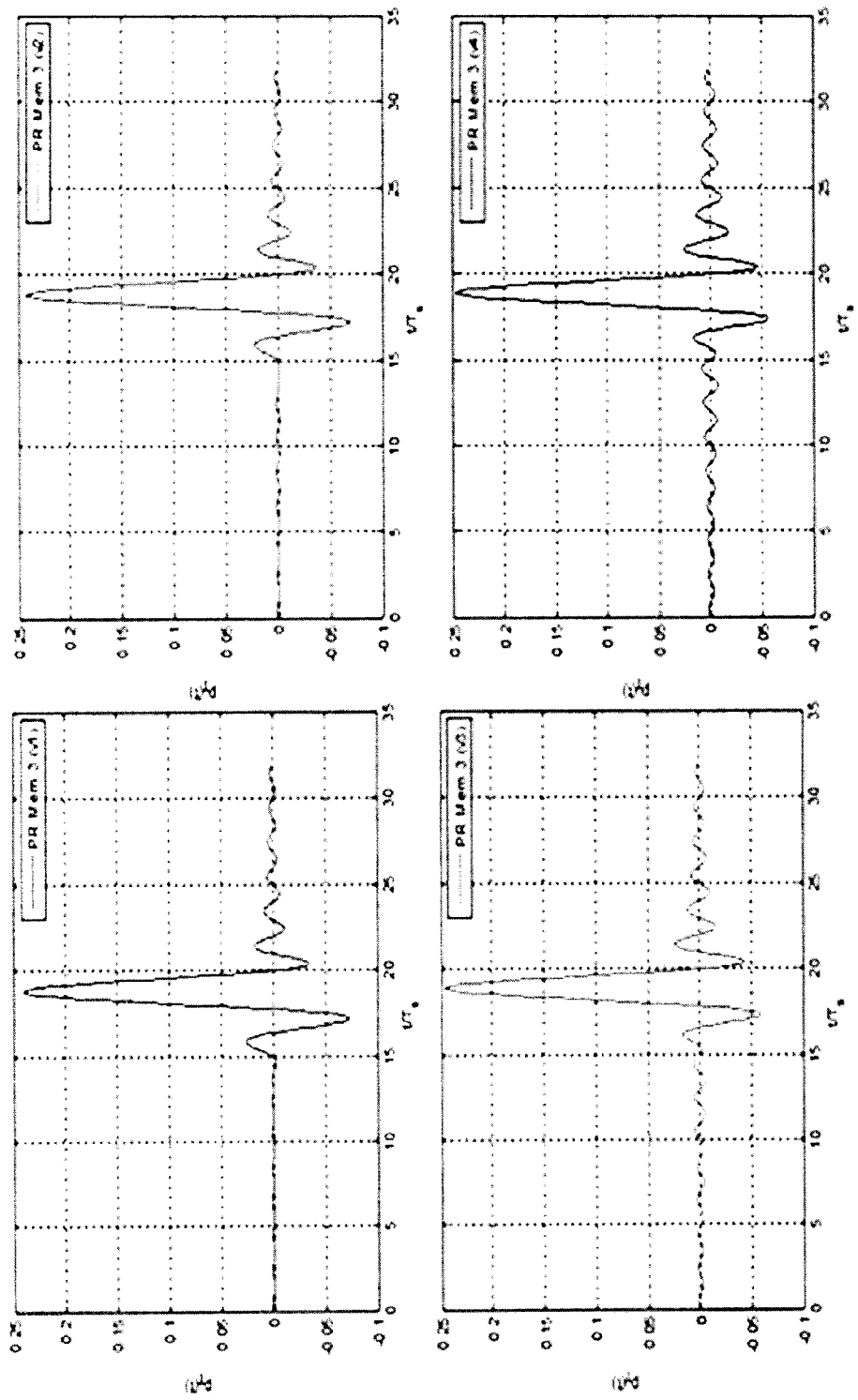
FIG. 3A shows four plots illustrating the impulse response of five example partial response transmit filters having a memory L=3 in accordance with example embodiments of the disclosed technology.
Figure 3B:
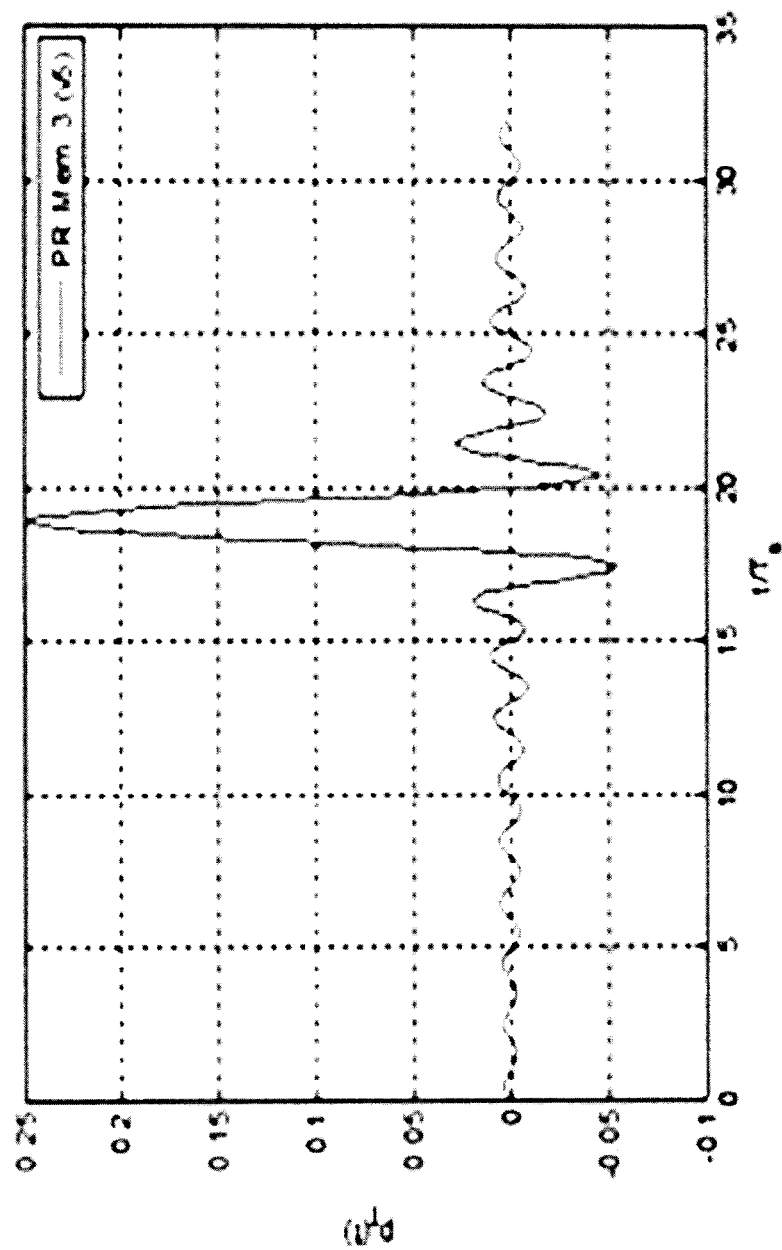
FIG. 3B shows a plot illustrating the impulse response of an example partial response transmit filter having a memory L=3 in accordance with example embodiments of the disclosed technology.

FIG. 2 shows two plots illustrating the impulse response of two example partial response transmit filters 110 having a memory L=2 in accordance with example embodiments of the disclosed technology. The filters have a delay of 16 symbols. FIGS. 3A-3B show five plots illustrating the impulse response of five example partial response transmit filters having a memory L=3 in accordance with example embodiments of the disclosed technology. The filters have a delay of 16 symbols.

Table 1, below, summarizes the peak to average power ratio (PAPR) in decibels (dB), applied to complex symbols drawn from the 4+12APSK constellation, of the seven partial response filters of FIGS. 2 and 3A-3B. Also, shown, for comparison purposes, is the PAPR when using a conventional RRC filter with roll-off 5%.

TABLE 1

PAPR at output of different transmit filters when applied to 4 + 12APSK

| Filter | $\{f_0, f_1, f_2, f_3\}$ | L | PAPR (dB) |
|---|---|---|---|
| RRC roll-off 5% | | | 7.3 dB |
| PR Mem 3 (v5) | {0.037, −0.09, 0.09, 0.98} | 3 | 7.0 dB |
| PR Mem 3 (v4) | {0.046, −0.123, 0.123, 0.9837} | 3 | 6.9 dB |
| PR Mem 3 (v3) | {0.058, −0.15, 0.15, 0.97} | 3 | 6.7 dB |
| PR Mem 3 (v2) | {0.088, −0.23, 0.23, 0.939} | 3 | 6.5 dB |
| PR Mem 3 (v1) | {0.098, −0.26, 0.26, 0.92} | 3 | 6.4 dB |
| PR Mem 2 (v1) | {−0.23, 0.61, 0.76} | 2 | 5.6 dB |
| PR Mem 2 (v2) | {0.22, −0.44, −0.87} | 2 | 5.9 dB |

As illustrated by Table 1, the new partial response filters disclosed herein exhibit a significantly lower PAPR than RRC filters with small roll-off factors.

Figure 4:
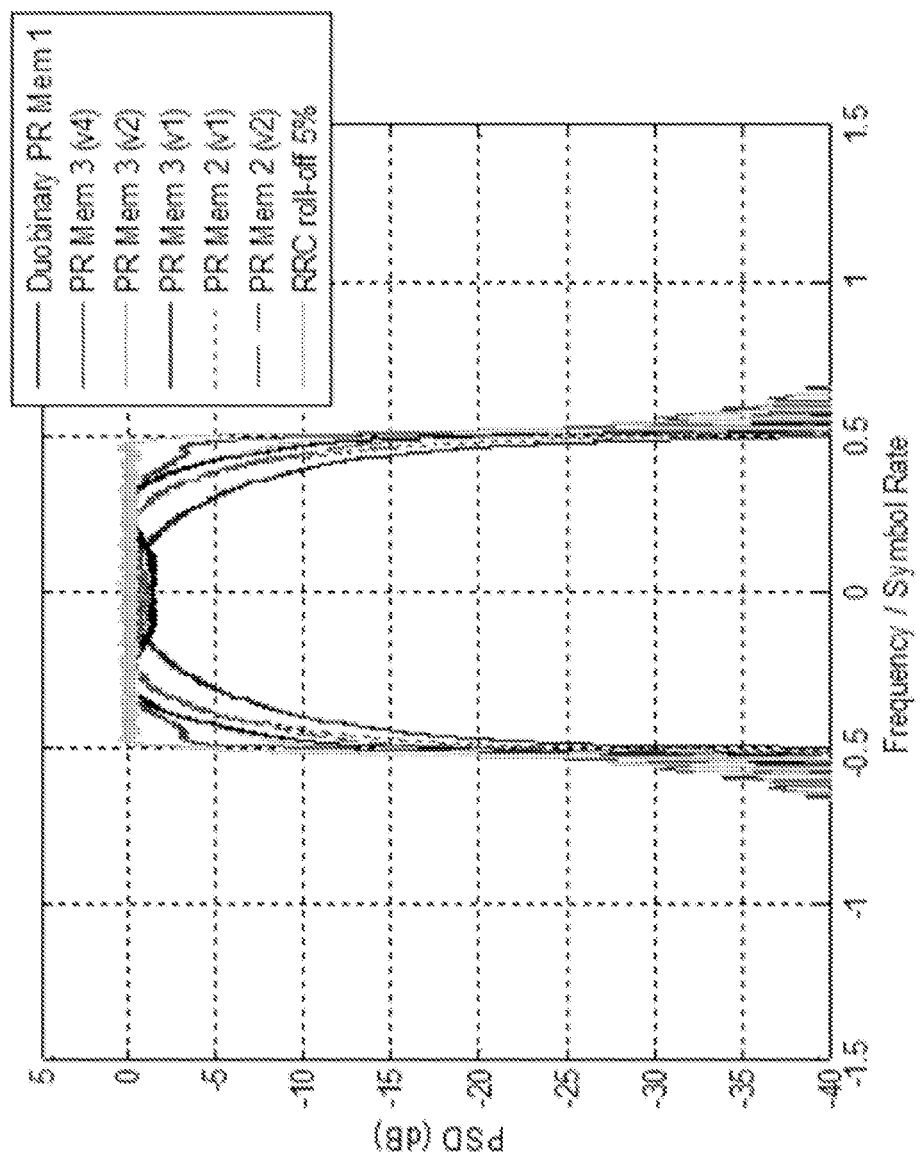
FIG. 4 is a power spectral density (PSD) plot illustrating the PSD in decibels as a function of the frequency/symbol rate of five of the partial response filters of FIGS. 2 and 3A-3B.

FIG. 4 is a power spectral density (PSD) plot illustrating the PSD in decibels as a function of the frequency/symbol rate of five of the partial response filters of FIGS. 2 and 3A-3B. Also, shown, for comparison purposes, is the PSD of a conventional RRC filter with roll-off 5% and a conventional Duobinary partial response filter that is used in linear satellite communication systems. As illustrated, the new partial response filters disclosed herein exhibit a more compact signal spectrum as compared to conventional RRC and Duobinary filters. In embodiments, the new partial response filters may be tuned to shape the modulated signal to match spectrum requirements and the IMUX and OMUX characteristics of transponder 200. Additionally, the compact spectrum permits signaling at higher symbol rates through the IMUX and OMUX filters.

Figure 5:
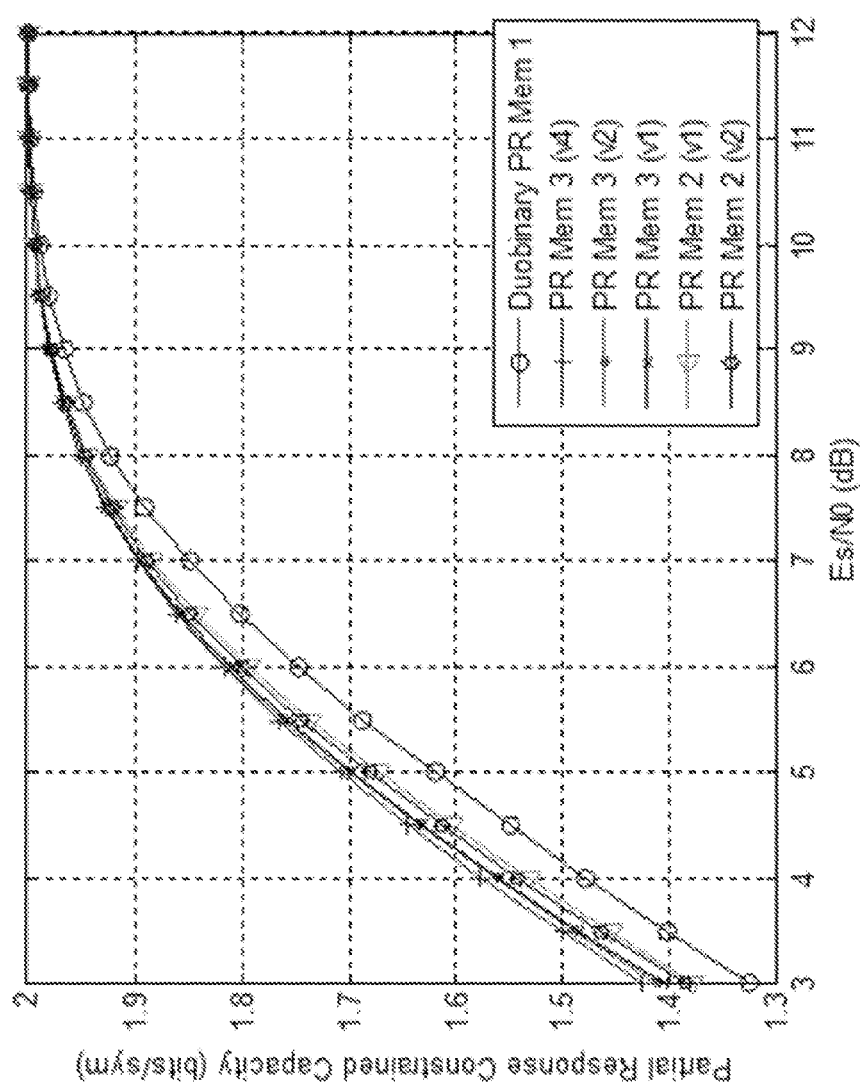
FIG. 5 is a constrained capacity plot illustrating the constrained capacity in bits/symbol as a function of the signal energy associated with each symbol divided by the noise spectral density ($E_s/N_0$) of five of the partial response filters of FIGS. 2 and 3A-3B, assuming QPSK modulation.

FIG. 5 is a constrained capacity plot illustrating the constrained capacity in bits/symbol as a function of the signal energy associated with each symbol divided by the noise spectral density ($E_s/N_0$) of five of the partial response filters of FIGS. 2 and 3A-3B, assuming QPSK modulation. In embodiments, the capacity or information rate is computed by running the BCJR algorithm on a trellis describing the finite state machine of the partial response signal. Also illustrated by FIG. 5 is the capacity of Duobinary partial response filters. As shown, the new partial response filters have a higher capacity while maintaining a spectral advantage over conventional filters.

Referring back to FIGS. 1A-1B, following partial response filtering of the transmit signals at filters 110, mixer 114 of transmitter 100 mixes the waveform signal $s_m(t)$ of the partial response filter outputs with a carrier signal $z_m(t)$ from a local oscillator (not shown) to modulate it onto an appropriate carrier for transmission. In embodiments, the carrier signal function $z_m(t)$ for a particular carrier m may be represented as $$\frac{1}{\sqrt{M_c}} e^{j(2\pi f_m t + \theta_m)},$$

where $f_m$ is the center frequency and $\theta_m$ is the carrier phase of m-th channel.

Adder 116 adds output signals from the plurality of transmitting carrier sources to provide a composite signal $s_c(t)$ that is transmitted to nonlinear satellite transponder 200. In embodiments following the mathematical implementation of Equation (1), the composite signal $s_c(t)$ may be expressed in complex form as Equation (3):

$$s_c(t) = \frac{1}{\sqrt{M_c}} \sum_{m=1}^{M_c} s_m(t) e^{j(2\pi f_m t + \theta_m)} \quad (3)$$

At transponder 200, composite signal $s_c(t)$ is processed through input multiplexing (IMUX) filter 210 to select the desired carrier. The second block of the transponder is a nonlinear amplifier 220, for example, a traveling-wave tube amplifier (TWTA), that amplifies its input signal at a back-off level that requires optimization. As noted above, the use of non-linear amplifier 220 in various embodiments introduces non-linear distortion into the signal. Following amplification, an output multiplexing (OMUX) filter 230 is applied to limit the interference to adjacent transponders, and composite signal $s_{NL}(t)$ is output.

During downlink transmission from transponder 200 to receiver 300, the signal may be contaminated by downlink noise n(t) such that the input to the receiver may be described by $r(t)=s_{NL}(t)+n(t)$. Accordingly, the input signal r(t) received at receiver 300 may include a combination of linear signal distortion resulting from partial response filtering applied by filters 110 and from filtering by IMUX filter 210 and OMUX filter 230, and the nonlinear signal distortion resulting from amplification of the transmitted signal at nonlinear transponder 200. In accordance with embodiments, a receiver 300 may be implemented that mitigates this distortion sufficiently to obtain an estimate of each carrier m's bits.

Figure 6:
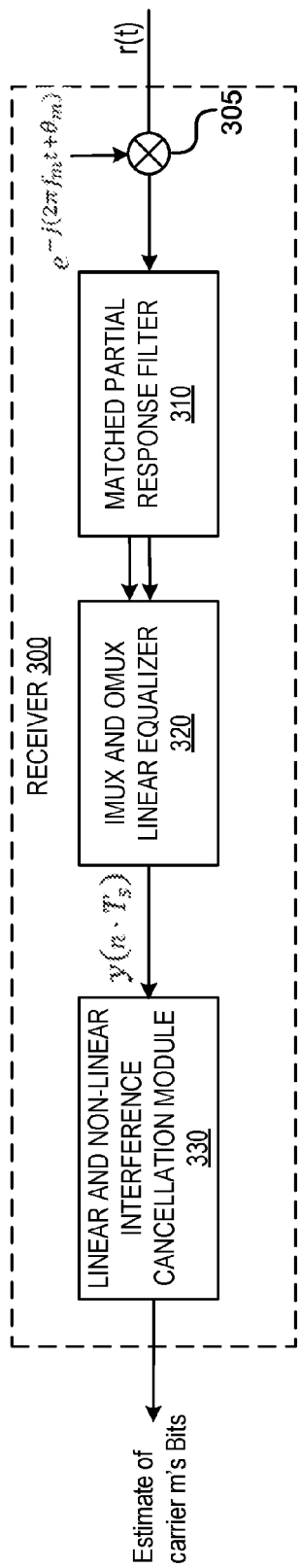
FIG. 6 illustrates an example partial response signaling receiver that may be implemented in the satellite communication system of FIG. 1A.
Figure 7:
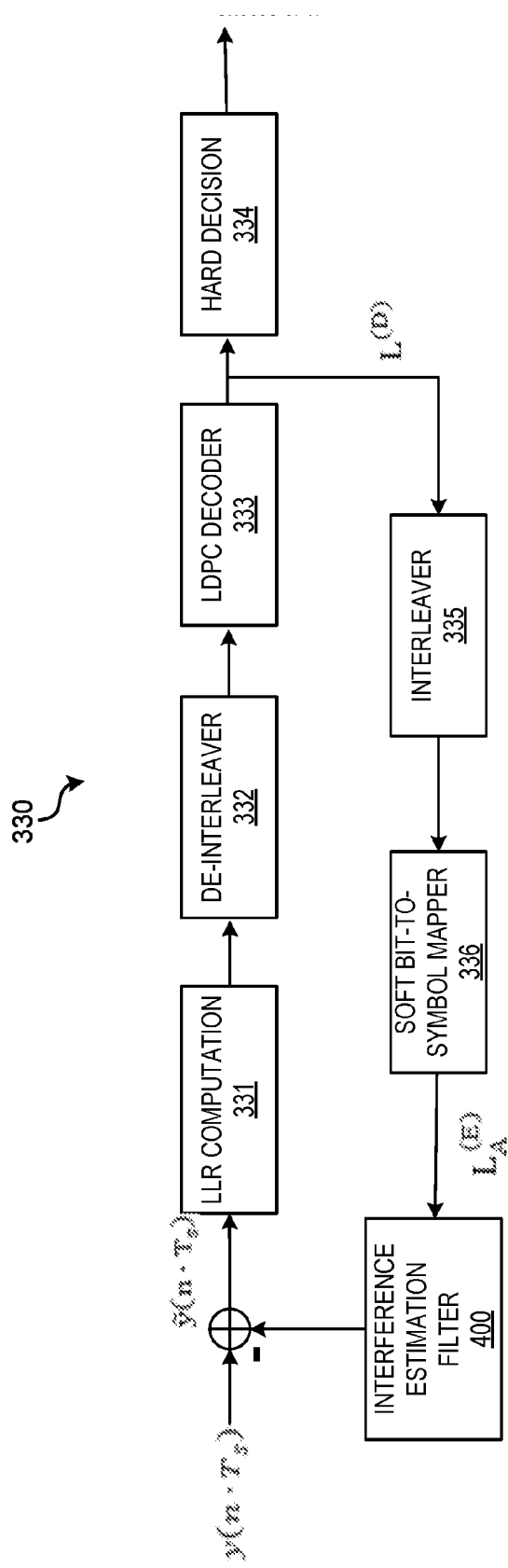
FIG. 7 illustrates an example linear and non-linear interference cancellation module that may be implemented in the receiver of FIG. 6 to remove distortion from a signal received in a nonlinear satellite communication system with partial response filtering.
Figure 8:
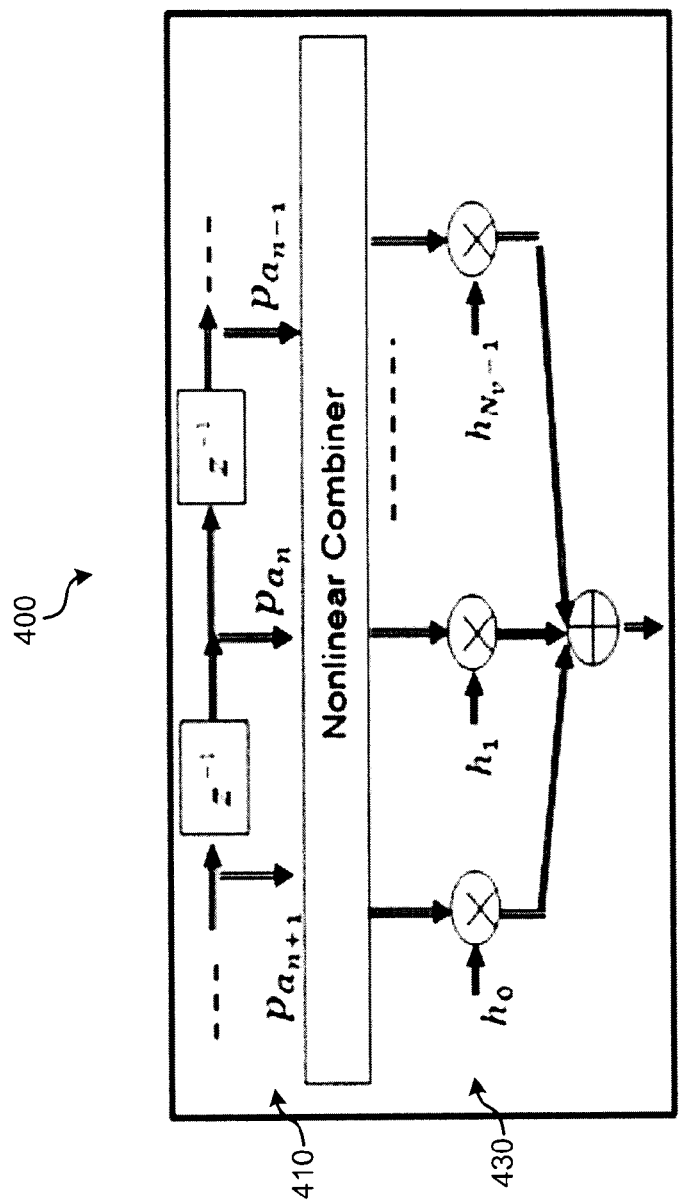
FIG. 8 illustrates an example interference estimation filter that may be implemented in the linear and non-linear interference cancellation module of FIG. 7.

FIGS. 6-8 illustrate one such exemplary implementation of a partial response signaling receiver 300 that receives an input signal r(t) on a carrier m and outputs an estimate of the carrier m's bits. As illustrated in FIG. 6, exemplary receiver 300 includes a mixer 305, a matched partial response filter 310, an IMUX and OMUX linear equalizer 320, and a linear and non-linear interference cancellation module 330. As would be understood by one having ordinary skill in the art, in some embodiments other configurations of receiver 300 may be implemented, and one or more components of receiver 300 can be implemented in either digital form (e.g., as software running on a DSP or other processing device, with the addition of a DAC) or as analog components.

Mixer 305 mixes the input waveform signal r(t) received from transponder 200 with a carrier down conversion signal $e^{-j(2\pi f_m t + \theta_m)}$ from a local oscillator (not shown) to downconvert the received signal to baseband. At block 310, a receiver partial response filter corresponding to (i.e., matched to) the transmit partial response filter 110 is applied to the downsampled carrier signal to generate an output signal x(t). For example, following the mathematical implementation illustrated in Equations (1)-(3), the signal at the receiver partial response matched filter output may be expressed as Equation (4):

$$x(t) = \int_{-\infty}^{\infty} r(t-\lambda) e^{-j(2\pi f_m(t-\lambda) + \theta_m)} p_R(\lambda) d\lambda \quad (4)$$

Where $\lambda$ is the variable of integration, $p_R(t)=p_T^*(-t)$ is the impulse response filter for a given carrier m, matched to the impulse response filter on the transmit side, $f_m$ is the center frequency of carrier m, and $\theta_m$ is the carrier phase of carrier m.

Equalizer 320 is configured to compensate for the linear distortion (i.e., group delay) resulting from the IMUX and OMUX in the non-linear transponder 200. In various embodiments, output signal x(t) is downsampled by a downsampler (not shown) at multiples of the symbol rate (e.g., at 2 samples-per-symbol as illustrated in FIG. 6), which allows for fractionally-spaced equalization at equalizer 320. At the output of equalizer 320 are samples $y(n \cdot T_s)$ that are at the symbol rate. For example, if 10,000 symbols were transmitted, then 10,000 instances of y are at the output of equalizer 320.

Figure 9:
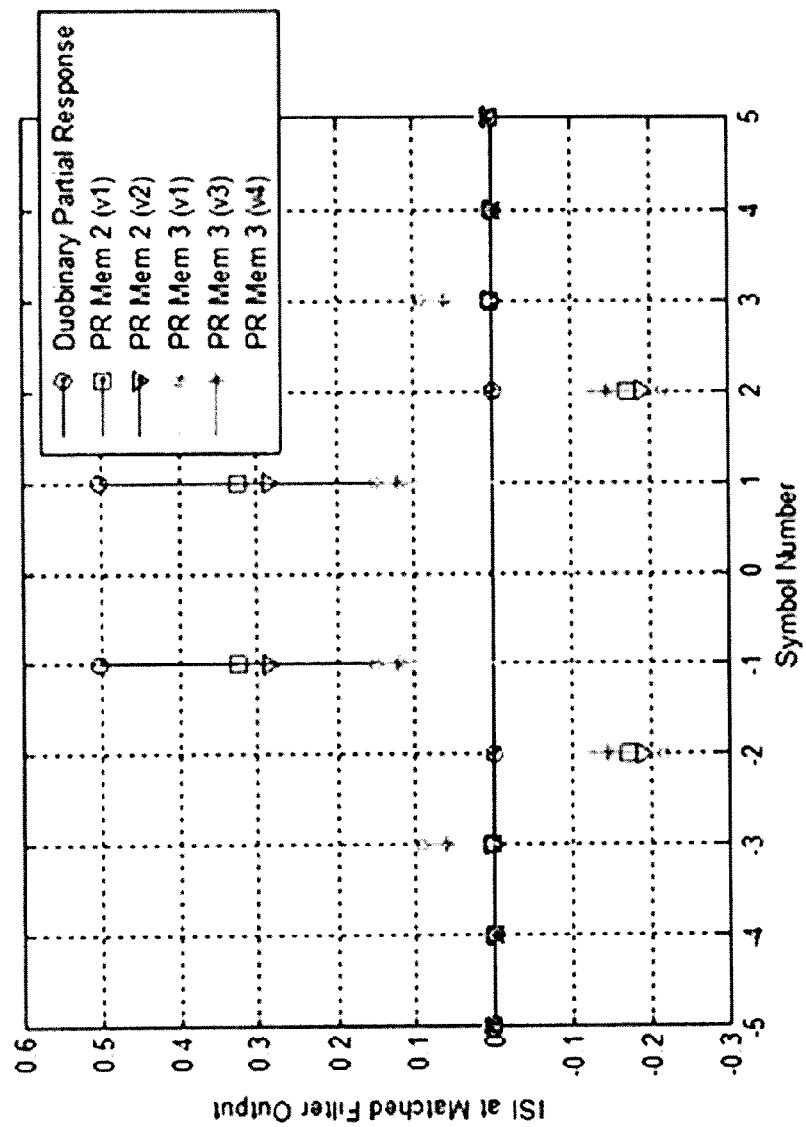
FIG. 9 illustrates an example of the ISI experienced in a linear-AWGN satellite channel, without IMUX and OMUX filters.

As noted above, the use of the partial response transmit filter 110 and corresponding matched receiver filter 310 creates linear ISI that is controlled but needs to be reduced. FIG. 9 illustrates one such example of the ISI experienced by $y(n \cdot T_s)$ in the case of a linear-AWGN channel, without IMUX and OMUX filters. Additionally, as noted above, non-linear ISI from amplifier 220 also needs to be reduced. Accordingly, in various embodiments a linear and non-linear interference cancellation module 330 may be implemented in receiver 300 for removing linear and non-linear interference from $y(n \cdot T_s)$ to obtain the desired symbol information. One such example of a module 330 is illustrated by FIG. 7.

As shown in FIG. 7, linear and non-linear interference cancellation module 330 takes as an input $y(n \cdot T_s)$ and iteratively subtracts an interference term estimated by filter 400 to obtain an estimate of the distortion free signal $\tilde{y}(n \cdot T_s)$. In embodiments, the estimated interference term (i.e., the linear and non-linear interference introduced along the satellite communication chain) may be based on subtracting an estimate of the transmitted signal from an estimate of the received signal.

Module 330 includes a log-likelihood ratios (LLRs) computation module 331, de-interleaver 332, low-density parity-check (LDPC) decoder 333, hard decision block 334, interleaver 335, soft bit-to-symbol mapper 336, and interference estimation filter 400. In various embodiments, module 300 works to mitigate the impact of partial-response induced linear ISI and the amplifier induced nonlinear distortion by exchanging soft-information between the LDPC decoder 333 and filter 400. In embodiments, filter 400 is able to reconstruct both, the distortion caused by the amplifier and the linear ISI due to partial response signaling using a priori estimates of the transmitted symbols, expressed as log-likelihood ratios (LLRs) $L_A^{(E)}(a_n)$ generated by module 331. This soft-information is the set of a posteriori LLRs of the code bits provided by the decoder, $L^{(D)}(b_{n'})$ after interleaving 335 and symbol-to-bit soft-mapping 336.

In various embodiments, interference estimation filter 400 uses a polynomial representation of a nonlinear system with memory to output an estimate of the signal interference. In a particular embodiment, the polynomial representation is based on the Volterra series. FIG. 8 illustrates one such exemplary interference estimation filter 400 based on a Volterra series. As shown, filter 400 receives as inputs interference-order filter coefficients $h_0 \ldots h_{N_V-1}$ and symbol combinations based on estimates of the transmitted symbols $a_n$ from LDPC decoder.

In various embodiments, compensation of distortion may be mathematically represented and derived as follows. The interference estimate provided by filter 400 may be subtracted from $y(n \cdot T_s)$ to obtain $\tilde{y}(n \cdot T_s)$ as shown in Equation (5):

$$\tilde{y}(n \cdot T_s) = y(n \cdot T_s) - [\underline{h}(n) \cdot E\{a_{NL}^{(1,3)}(n) | L_A^{(E)}(a_n)\} - E\{\rho^{centroid}(a_n) | L_A^{(E)}(a_n)\}] \quad (5)$$

Where $\underline{h}(n)$ is the set of Volterra filter coefficients, chosen to model the amplifier and partial response induced distortion, $\rho^{centroid}(a_n)$ is the centroid associated with symbol $a_n$, of the clusters at the fractionally-spaced equalizer output, found during training mode. Also, as shown, the first term $\underline{h}(n) \cdot E\{a_{NL}^{(1,3)}(n) | L_A^{E}(a_n)\}$ provides an estimate of the received signal whereas the second term $E\{\rho^{centroid}(a_n) | L_A^{(E)}(a_n)\}$ provides an estimate of the transmitted signal. Accordingly the difference of these two terms, i.e. estimate of what was received minus an estimate of what was transmitted, provides an estimate of the total interference.

As illustrated, the superscripts 1 and 3 indicate first order linear distortion and third order distortion. However, it should be noted that in alternative embodiments the distortion may be modeled for higher orders (e.g., fifth order and higher).

In one embodiment of this mathematical implementation, the Volterra coefficients $\underline{h}(n)$ may be defined by Equation (6) through (8):

$$\underline{h}(n) = [h^{(1)}(L')^T h^{(3)}(L)^T] \quad (6)$$

Where $$h^{(1)}(L') = \gamma^{(1)} \begin{bmatrix} h^{(1)}\left(\left(\frac{L'-1}{2}\right)T_s\right) \\ h^{(1)}\left(\left(\frac{L'-1}{2}-1\right)T_s\right) \\ \vdots \\ h^{(1)}\left(\left(-\frac{L'-1}{2}\right)T_s\right) \end{bmatrix} \quad (7)$$

$h^{(1)}(t) = \int_{-\infty}^{\infty} p_T(t-\lambda) p_R(\lambda) d\lambda$, is the first-order Volterra kernel. And, $$h^{(3)}(L') = \gamma^{(3)} \begin{bmatrix} h^{(3)}\left(\left(\frac{L-1}{2}\right)T_s, \left(\frac{L-1}{2}\right)T_s, \left(\frac{L-1}{2}\right)T_s\right) \\ h^{(3)}\left(\left(\frac{L-1}{2}-1\right)T_s, \left(\frac{L-1}{2}\right)T_s, \left(\frac{L-1}{2}-1\right)T_s\right) \\ \vdots \\ h^{(3)}\left(\left(-\frac{L-1}{2}\right)T_s, \left(-\frac{L-1}{2}\right)T_s, \left(-\frac{L-1}{2}\right)T_s\right) \end{bmatrix} \quad (8)$$

$h^{(3)}(t_1,t_2,t_3) = \int_{-\infty}^{\infty} p_T(t_1-\lambda) p_T(t_2-\lambda) p^*_T(t_3-\lambda) p_R(\lambda) d\lambda$ is the third-order Volterra kernel. L' and L represent the memory span of the first and third-order terms accounted for in the Turbo Volterra receiver module. In embodiments, the coefficients $h^{(1)}(L')$ and $h^{(3)}(L)$ may be found using stochastic gradient-based algorithms that arrive iteratively at the solution without a priori knowledge of the kernels. Alternatively, in other embodiments $h^{(1)}(L')$ and $h^{(3)}(L)$ may be computed analytically using y and h.

The corresponding vector of 1st- and 3rd-order symbol combinations in $a_{NL}^{(1,3)}(n)$ may be defined by Equation (9):

$$a_{NL}^{(1,3)}(n) = \begin{bmatrix} a_{n-\frac{L'-1}{2}} \\ \vdots \\ a_{n-\frac{L'-1}{2}} \\ a_{n-\frac{L-1}{2}} \cdot a_{n-\frac{L-1}{2}} \cdot a^*_{n-\frac{L-1}{2}} \\ \vdots \\ a_{n+\frac{L-1}{2}} \cdot a_{n+\frac{L-1}{2}} \cdot a^*_{n+\frac{L-1}{2}} \end{bmatrix} \quad (9)$$

During the first iteration, in the absence of decoder soft-information, $\tilde{y}(n \cdot T_s) = y(n \cdot T_s)$. Alternatively, hard-symbol decisions may be made on $y(n \cdot T_s)$ instead on the expectations obtained from soft-information provided by the decoder 333. A lower bound on the error rate performance is obtained when the symbol decisions are "perfect" i.e. known at the receiver. This however is not realistic and the turbo-Volterra method seeks to approach this lower bound by progressively improving on the quality of the symbol decisions through iterations with the FEC decoder.

The third-order expectation $E\{a_{NL}^{(3)}(n) | L_A^{(E)}(a_n)\}$ may be calculated as illustrated in Equation (10):

$$E\{a_{NL}^{(3)}(n) | L_A^{(E)}(a_n)\} = \Pi_{i=n-(L-1)/2}^{n+(L-1)/2} E\{a_i^{v_i}(a_i^{v^*i})^* | L_A^{(E)}(a_n)\} \quad (10)$$

Where the parameters $v_i$ and $v^*_i$ are power terms that arise from the various third-order symbol combinations. The individual product terms are then computed as shown in Equation (11):

$$E\{a_i^{v_i}(a_i^{v^*i})^* | L_A^{(E)}(a_n)\} = \Sigma_{l=1}^{M} a_l^{v_i}(a_l^{v^*i})^* \cdot P\{a_i = a_l | L_A^{(E)}(a_n)\} \quad (11)$$

Where the conditional probability is formed on the basis of the a priori LLRs for the corresponding symbol $a_n$, provided by the LDPC decoder 333 at the previous iteration. After a certain number of maximum iterations, the receiver 300 generates estimates of the transmitted symbols.

Figure 10A:
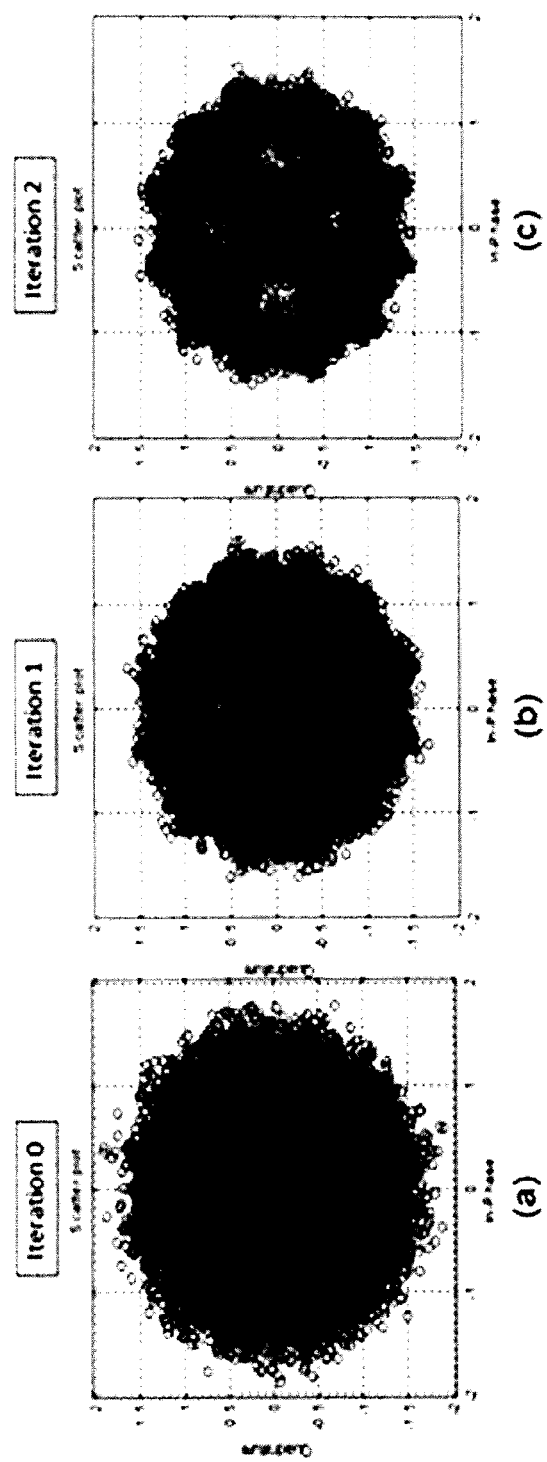
FIG. 10A shows three scatter plots (a) through (c) illustrating the working of a turbo-Volterra receiver through two iterations of an example interference cancellation module in mitigating the distortion caused by partial response ISI as well as the nonlinear ISI introduced by a transponder in accordance with an embodiment of the disclosed technology.
Figure 10B:
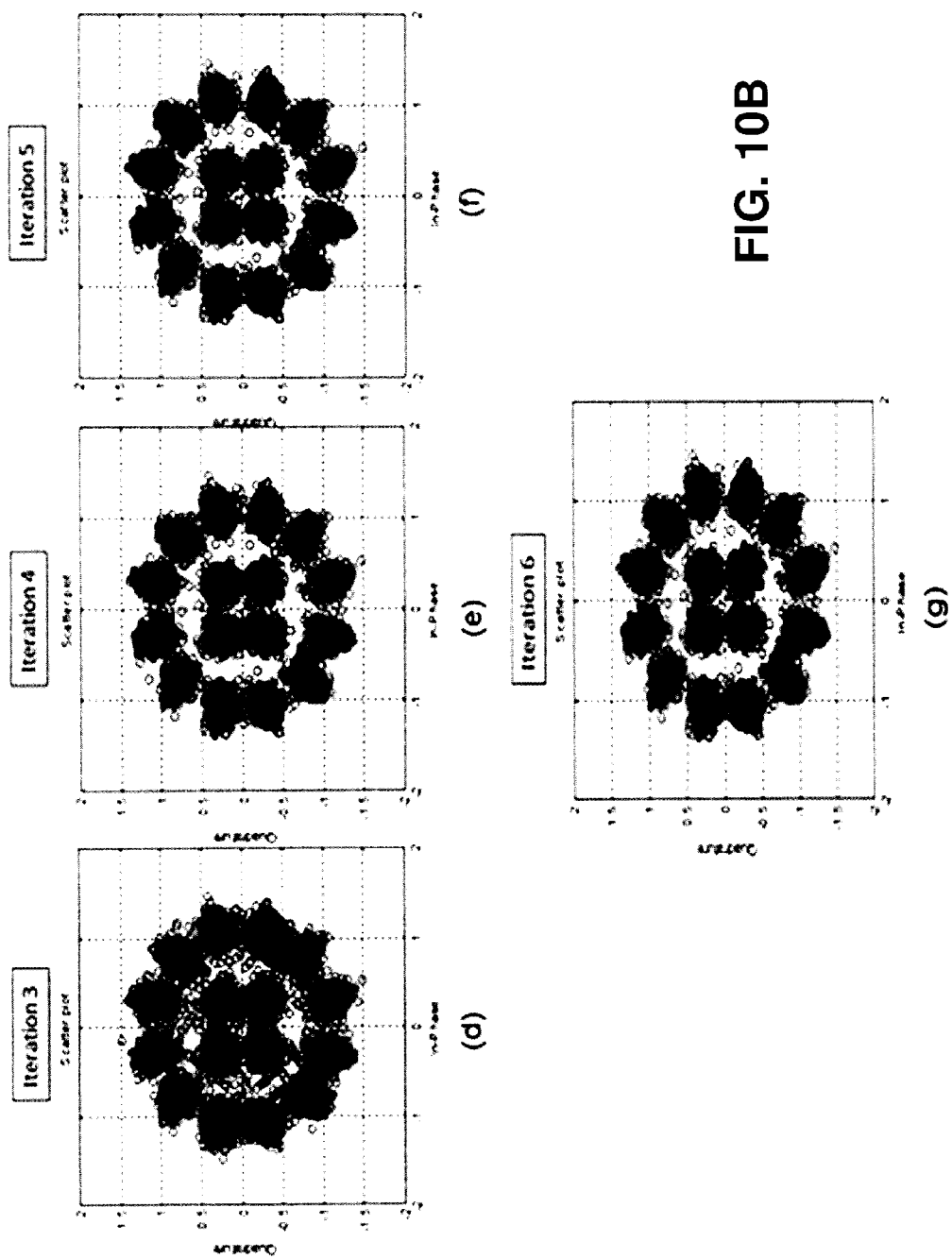
FIG. 10B shows four scatter plots (d) through (g) illustrating the working of the turbo-Volterra receiver of FIG. 10A through four additional iterations in mitigating the distortion caused by partial response ISI as well as the nonlinear ISI introduced by a transponder in accordance with an embodiment of the disclosed technology.

FIG. 10A-10B show seven scatter plots (a) through (g) illustrating the working of a turbo-Volterra receiver through six iterations of an example interference cancellation module 330 in mitigating the distortion caused by partial response ISI as well as the nonlinear ISI introduced by a transponder in accordance with an embodiment of the disclosed technology. In this example embodiment, four carriers-per-TWTA, with an output-back-off of 3 dB were assumed. The four carriers used the same novel partial response filter.

Plot (a) of FIG. 10A. shows the noiseless scatter-plot of the samples at the linear equalizer output (e.g., equalizer 200), i.e. $y(n \cdot T_s)$ of one of the inner carriers. As shown, the underlying 4+12APSK constellation (marked in red-squares) which was transmitted on this carrier has been severely distorted by the ISI and nonlinear distortion. If left unmitigated, this distortion would impose a substantial performance penalty. Plots (b) through (g) of FIGS. 10A-10B illustrate the improvement in the received samples as the example turbo-Volterra equalizer effectively uses soft information from an example decoder to clean up the partial response ISI and nonlinear distortion. As the quality of the soft-information improves with each iteration, so does the clarity of the scatter-plot.

Figure 11:
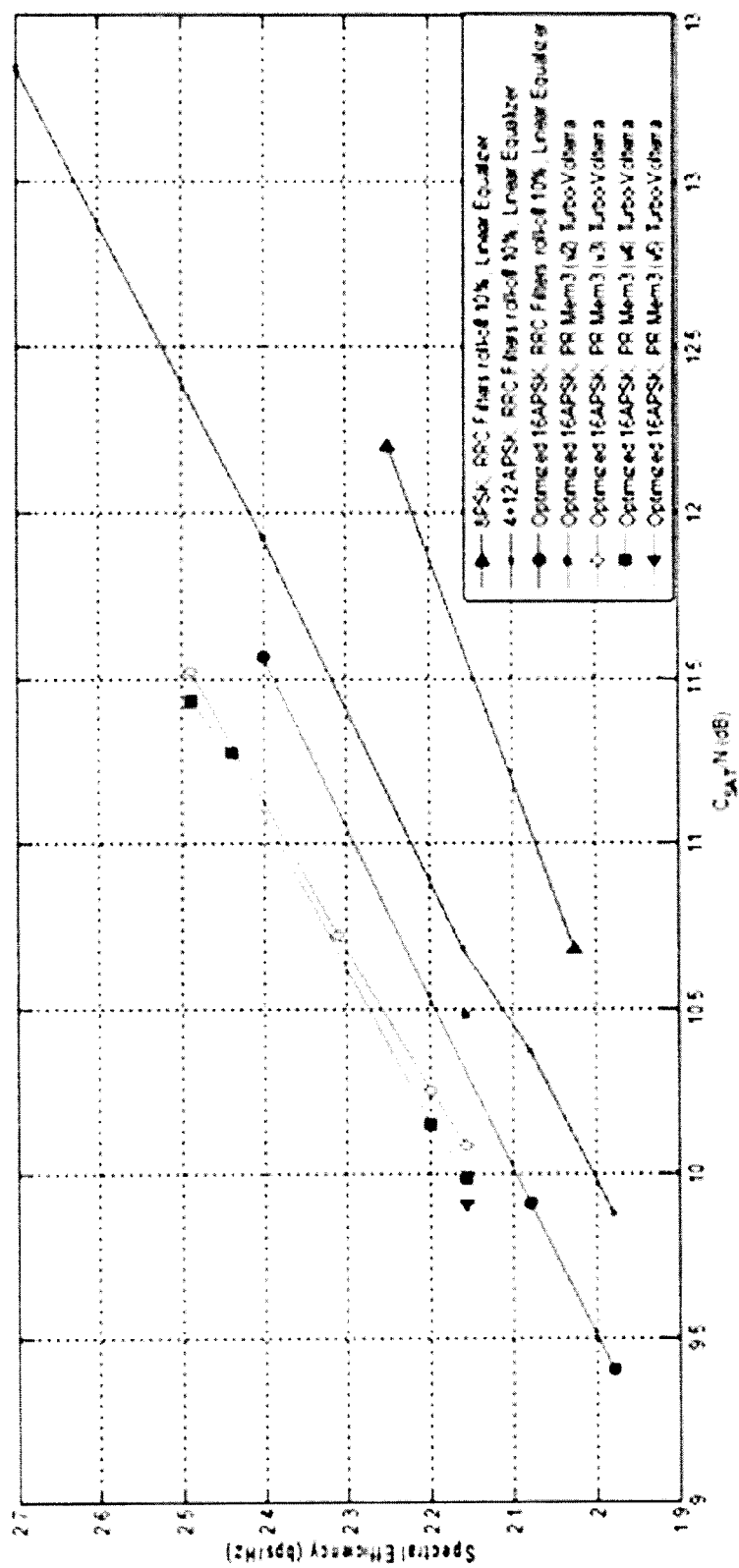
FIG. 11 is a plot illustrating the measured error rate performance of various embodiments of the disclosed partial response filters versus the spectral efficiency performance of conventional filters in a communication configuration having four carriers in a transponder.

FIG. 11 is a plot illustrating the measured error rate performance of various embodiments of the disclosed partial response filters versus the spectral efficiency performance of conventional filters in a configuration having four carriers in a channel (i.e., four carriers share the transponder amplifier). As shown, the measured error rate performance of the example partial response filters exceeds that of the conventional RRC filters.

Figure 12:
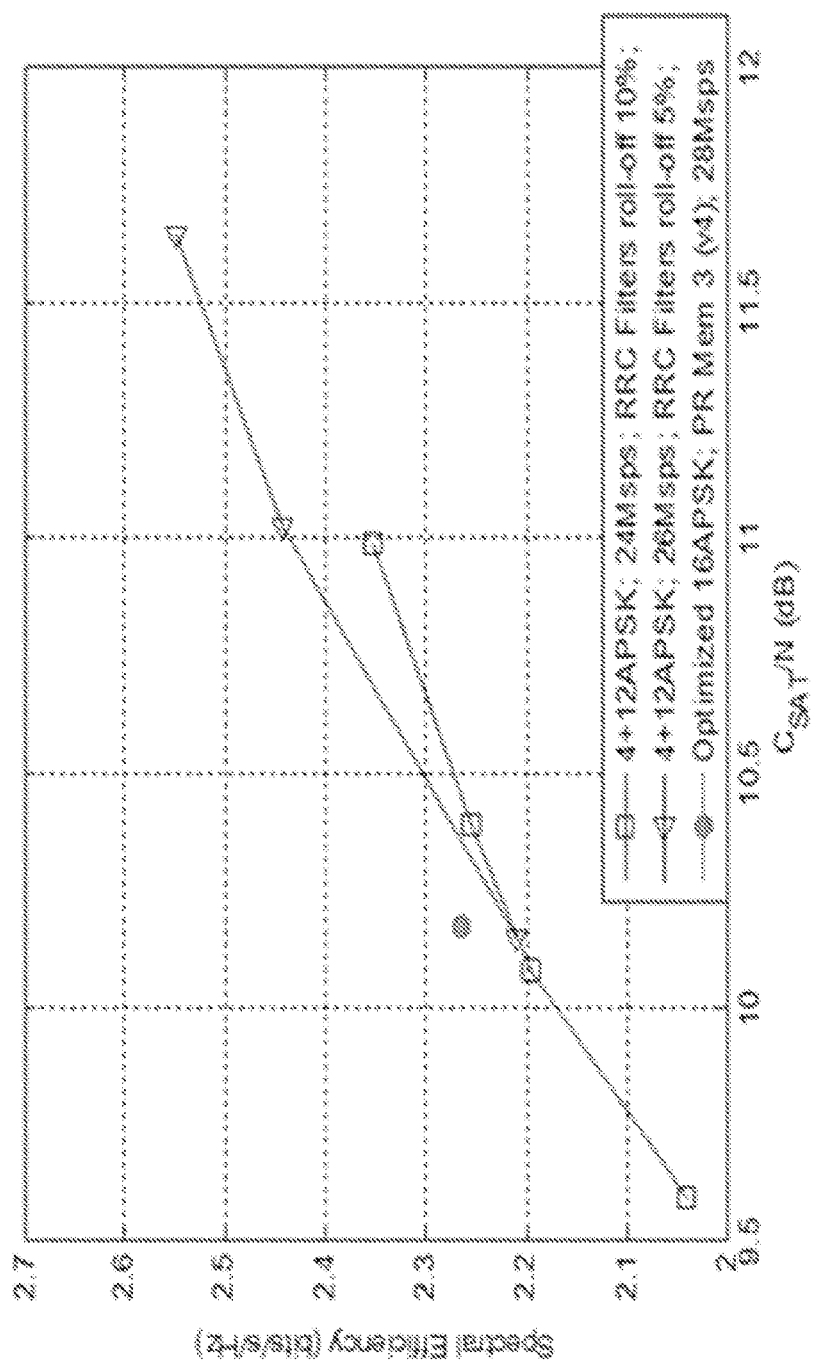
FIG. 12 is a plot illustrating the measured error rate performance of an embodiment of the disclosed partial response filters versus the spectral efficiency performance of conventional filters in a communication configuration having one carrier in a transponder.

FIG. 12 is a plot illustrating the measured error rate performance of an embodiment of the disclosed partial response filters versus the spectral efficiency performance of conventional filters in a configuration having one carrier in a channel (i.e., single carrier through transponder). As shown, the measured error rate performance of the example partial response filter exceeds that of the conventional RRC filters.

Figure 13:
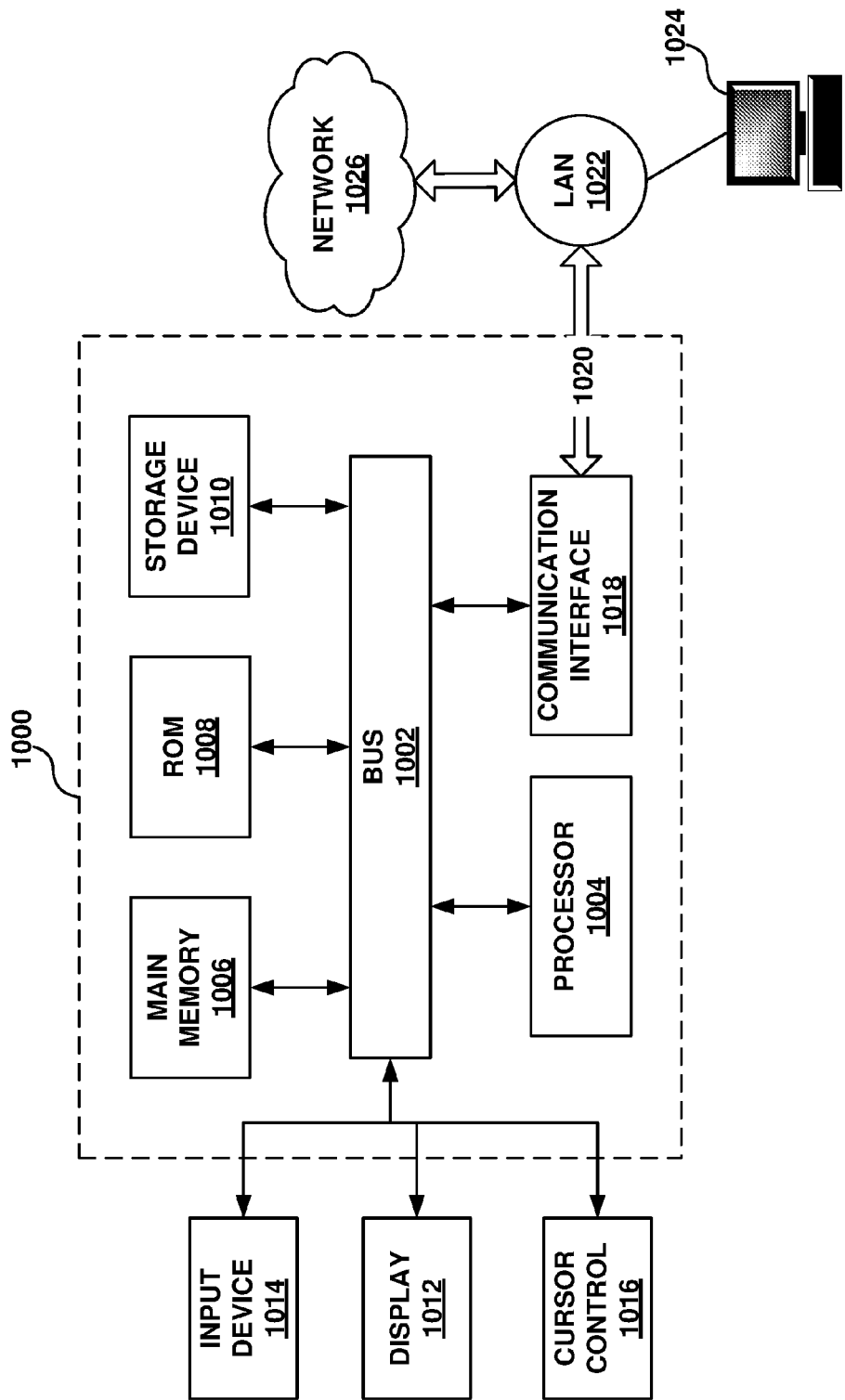
FIG. 13 illustrates an example computing module that may be used in implementing features of various embodiments.

FIG. 13 illustrates a computer system 1000 upon which example embodiments according to the present disclosure can be implemented. Computer system 1000 can include a bus 1002 or other communication mechanism for communicating information, and a processor 1004 coupled to bus 1002 for processing information. Computer system 1000 may also include main memory 1006, such as a random access memory (RAM) or other dynamic storage device, coupled to bus 1002 for storing information and instructions to be executed by processor 1004. Main memory 1006 can also be used for storing temporary variables or other intermediate information during execution of instructions to be executed by processor 1004. Computer system 1000 may further include a read only memory (ROM) 1008 or other static storage device coupled to bus 1002 for storing static information and instructions for processor 1004. A storage device 1010, such as a magnetic disk or optical disk, may additionally be coupled to bus 1002 for storing information and instructions.

Computer system 1000 can be coupled via bus 1002 to a display 1012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1014, such as a keyboard including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment of the disclosure, partial response signaling, in accordance with example embodiments, are provided by computer system 1000 in response to processor 1004 executing an arrangement of instructions contained in main memory 1006. Such instructions can be read into main memory 1006 from another computer-readable medium, such as storage device 1010. Execution of the arrangement of instructions contained in main memory 1006 causes processor 1004 to perform one or more processes described herein. One or more processors in a multi-processing arrangement may also be employed to execute the instructions contained in main memory 1006. In alternative embodiments, hard-wired circuitry is used in place of or in combination with software instructions to implement various embodiments. Thus, embodiments described in the present disclosure are not limited to any specific combination of hardware circuitry and software.

Computer system 1000 may also include a communication interface 1018 coupled to bus 1002. Communication interface 1018 can provide a two-way data communication coupling to a network link 1020 connected to a local network 1022. By way of example, communication interface 1018 may be a digital subscriber line (DSL) card or modem, an integrated services digital network (ISDN) card, a cable modem, or a telephone modem to provide a data communication connection to a corresponding type of telephone line. As another example, communication interface 1018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1018 sends and receives electrical, electromagnetic, or optical signals that carry digital data streams representing various types of information. Further, communication interface 1018 may include peripheral interface devices, such as a Universal Serial Bus (USB) interface, a PCMCIA (Personal Computer Memory Card International Association) interface, etc.

Network link 1020 typically provides data communication through one or more networks to other data devices. By way of example, network link 1020 can provide a connection through local network 1022 to a host computer 1024, which has connectivity to a network 1026 (e.g. a wide area network (WAN) or the global packet data communication network now commonly referred to as the "Internet") or to data equipment operated by service provider. Local network 1022 and network 1026 may both use electrical, electromagnetic, or optical signals to convey information and instructions. The signals through the various networks and the signals on network link 1020 and through communication interface 1018, which communicate digital data with computer system 1000, are example forms of carrier waves bearing the information and instructions.

Computer system 1000 may send messages and receive data, including program code, through the network(s), network link 1020, and communication interface 1018. In the Internet example, a server (not shown) might transmit requested code belonging to an application program for implementing an embodiment of the present disclosure through network 1026, local network 1022 and communication interface 1018. Processor 1004 executes the transmitted code while being received and/or store the code in storage device 1010, or other non-volatile storage for later execution. In this manner, computer system 1000 obtains application code in the form of a carrier wave.

The term "computer-readable medium" as used herein refers to any medium that participates in providing instructions to processor 1004 for execution. Such a medium may take many forms, including but not limited to non-volatile media, volatile media, and transmission media. Non-volatile media include, for example, optical or magnetic disks, such as storage device 1010. Volatile media may include dynamic memory, such as main memory 1006. Transmission media may include coaxial cables, copper wire and fiber optics, including the wires that comprise bus 1002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 14:
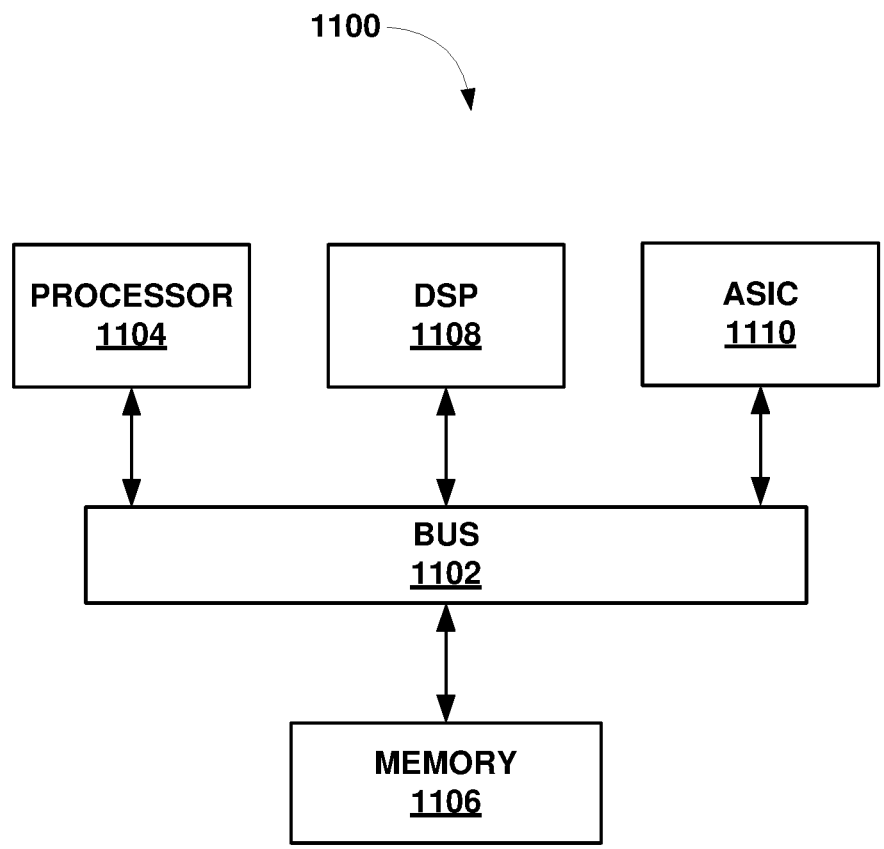
FIG. 14 illustrates an example chip set that can be utilized in implementing partial response signaling methods in accordance with various embodiments.

FIG. 14 illustrates a chip set 1100 in which embodiments of the disclosure may be implemented. Chip set 1100 can include, for instance, processor and memory components described with respect to FIG. 14 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1100 includes a communication mechanism such as a bus 1002 for passing information among the components of the chip set 1100. A processor 1104 has connectivity to bus 1102 to execute instructions and process information stored in a memory 1106. Processor 1104 includes one or more processing cores with each core configured to perform independently. A multi-core processor enables multiprocessing within a single physical package. Examples of a multi-core processor include two, four, eight, or greater numbers of processing cores. Alternatively or in addition, processor 1104 includes one or more microprocessors configured in tandem via bus 1102 to enable independent execution of instructions, pipelining, and multithreading. Processor 1004 may also be accompanied with one or more specialized components to perform certain processing functions and tasks such as one or more digital signal processors (DSP) 1108, and/or one or more application-specific integrated circuits (ASIC) 1110. DSP 1108 can typically be configured to process real-world signals (e.g., sound) in real time independently of processor 1104. Similarly, ASIC 1110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1104 and accompanying components have connectivity to the memory 1106 via bus 1102. Memory 1106 includes both dynamic memory (e.g., RAM) and static memory (e.g., ROM) for storing executable instructions that, when executed by processor 1104, DSP 1108, and/or ASIC 1110, perform the process of example embodiments as described herein. Memory 1106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A communication system, comprising:
a transmitter comprising:
a partial response transmit filter configured to convert complex-valued data symbols to a transmit signal using a partial response pulse shaping function; and
a modulator configured to modulate the transmit signal onto a carrier wave for transmission as a modulated transmit signal; and
a nonlinear satellite transponder configured to receive the modulated transmit signal and comprising a nonlinear amplifier for amplifying the modulated the modulated transmit signal to be broadcast to one or more receivers,
wherein the pulse shaping function is given by $$PT(t) = \sum_{l=0}^{L-1} f_l \cdot \operatorname{sinc}\left(\frac{t - lT_s}{T_s}\right)$$

Where L is an integer, single-sided memory span of the transmit filter, $T_s$ is the symbol duration, and $f_l$ is a coefficient associated with a memory l.

2. The system of claim 1, wherein L is 2 or 3.

3. The system of claim 1, wherein the transponder further comprises: an input multiplexing (IMUX) filter and an output multiplexing (OMUX) filter, and wherein the coefficient $f_l$ is based at least in part on the IMUX filter and the OMUX filter.

4. The system of claim 1, wherein the amplifier is a power amplifier.

5. The system of claim 1, further comprising: a downlink receiver configured to receive the broadcasted amplified modulated transmit signal, the receiver comprising a partial response receiver filter matched to the partial response transmit filter.

6. A communication system, comprising:
a transmitter comprising:
a first partial response transmit filter configured to convert a first set of complex-valued data symbols to a first transmit signal using a partial response pulse shaping function;
a second partial response transmit filter configured to convert a second set of complex-valued data symbols to a second transmit signal using a partial response pulse shaping function;
a first modulator configured to modulate the first transmit signal onto a carrier wave for transmission as a first modulated transmit signal;
a second modulator configured to modulate the second transmit signal onto a second carrier wave for transmission as a second modulated transmit signal; and
an adder configured to add the first and second modulated transmit signals to generate a composite signal; and
a nonlinear satellite transponder configured to receive the composite signal and comprising a nonlinear amplifier for amplifying transmit signals to be broadcast to one or more receivers.

7. The system of claim 6, wherein the transponder is configured to receive the composite signal at an input multiplexing (IMUX) filter.

8. A method, comprising:
converting complex-valued data symbols to a transmit signal using a partial response pulse shaping function of a partial response transmit filter;
modulating the transmit signal onto a carrier wave for transmission as a modulated transmit signal;
receiving the modulated transmit signal at a nonlinear satellite transponder; amplifying the received modulated transmit signal using a nonlinear amplifier of the satellite transponder; and
broadcasting the amplified modulated transmit signal from the satellite transponder to one or more downlink receivers,
wherein the pulse shaping function is given by $$PT(t) = \sum_{l=0}^{L-1} f_l \cdot \operatorname{sinc}\left(\frac{t - lT_s}{T_s}\right)$$

Where L is an integer, single-sided memory span of the transmit filter, $T_s$ is the symbol duration, and $f_l$ is a coefficient associated with a memory l.

9. A method, comprising:
converting a first set of complex-valued data symbols to a first transmit signal using a partial response pulse shaping function of a partial response transmit filter;
modulating the first transmit signal onto a carrier wave for transmission as a first modulated transmit signal using a first modulator;
converting a second set of complex-valued data symbols to a second transmit signal using a partial response pulse shaping function of a second partial response transmit filter;
modulating the second transmit signal onto a second carrier wave for transmission as a second modulated transmit signal using a second modulator;
adding the first and second modulated transmit signals to generate a composite signal; and
transmitting the composite signal to a nonlinear satellite transponder, wherein the nonlinear satellite transponder comprises a nonlinear amplifier for amplifying transmit signals to be broadcast to one or more receivers.

10. A transmitter for a satellite communication system, comprising:
a partial response transmit filter configured to convert complex-valued data symbols to a transmit signal using a partial response pulse shaping function; and circuitry for modulating the transmit signal onto a carrier wave for transmission as a modulated transmit signal, wherein the transmitter transmits the modulated transmit signal to a satellite transponder, wherein the pulse shaping function is given by:

$$PT(t) = \sum_{l=0}^{L-1} f_l \cdot \text{sinc}\left(\frac{t - lT_s}{T_s}\right)$$

Where L is an integer, single-sided memory span of the transmit filter, $T_s$ is the symbol duration, and $f_l$ is a coefficient associated with a memory l.

11. The transmitter of claim 10, further comprising:
a second partial response transmit filter configured to convert a second set of complex valued data symbols to a second transmit signal using the partial response pulse shaping function;
circuitry for modulating the second transmit signal onto a second carrier wave for transmission as a second modulated transmit signal; and
circuitry for adding the first and second modulated transmit signals to generate a composite signal.

12. The transmitter of claim 10, wherein the coefficient $f_l$ is based at least in part on an input multiplexing (IMUX) filter and an output multiplexing (QMUX) filter of a satellite transponder.

13. The transmitter of claim 10, wherein L is 2 or 3.

14. A partial response signaling receiver, comprising:
circuitry for downconverting a received input signal, wherein the partial response signaling receiver receives signals from a satellite transponder; and
a partial response receive filter with impulse function PR(t) for filtering the downconverted signal;
wherein the impulse function is given by PR(t)=PR*(−t), wherein PT(t) is a pulse shaping function of a matched partial response transmit filter, wherein $$PT(t) = \sum_{l=0}^{L-1} f_l \cdot \text{sinc}\left(\frac{t - lT_s}{T_s}\right)$$

Where L is an integer, single-sided memory span of the transmit filter, $T_s$ is the symbol duration, and $f_l$ is a coefficient associated with a memory l.

15. A partial response signaling receiver, comprising:
circuitry for downconverting a received input signal, wherein the received input signal is received from a satellite transponder comprising an input multiplexing (IMUX) filter and an output multiplexing (QMUX) filter;
a partial response receive filter with an impulse function for filtering the downconverted signal;
a downsampler for downsampling the partial response filtered signal; and
a linear equalizer for equalizing the downsampled signal and configured to compensate for a group delay resulting from the IMUX filter and OMUX filter.

16. A partial response signaling receiver, comprising:
circuitry for downconverting a received input signal, wherein the partial response signaling receiver receives signals from a satellite transponder;
a partial response filter with a partial response impulse function for filtering the downconverted signal;
a downsampler for downsampling the partial response filtered signal; a linear equalizer for equalizing the downsampled signal; and
circuitry for removing linear inter-symbol interference (ISI) and non-linear ISI in the input signal, wherein the circuitry for removing linear and non-linear ISI comprises an interference estimate filter configured to estimate interference in the input signal by creating a polynomial representation of a nonlinear satellite system with memory.

17. The receiver of claim 16, wherein the polynomial representation is based on a Volterra series.

18. The receiver of claim 17, wherein the interference estimate may be expressed as $$[\underline{h}(n) \cdot E\{a_{NL}^{(1,3)}(n)|L_A^{(E)}(a_n)\} - E\{\rho^{centroid}(a_n)|L_A^{(E)}(a_n)\}]$$

Where $\underline{h}(n)$ is a set of Volterra filter coefficients, chosen to model an amplifier and partial response induced distortion in the nonlinear satellite system, $\rho^{centroid}(a_n)$ is the centroid associated with symbol $a_n$, of the clusters at the fractionally-spaced equalizer output, found during training mode, $a_{NL}^{(1,3)}(n)$ is a vector of 1st- and 3rd-order symbol combinations, the term $[\underline{h}(n) \cdot E\{a_{NL}^{(1,3)}(n)|L_A^{(E)}(a_n)\}]$ estimates a received signal, and the term $E\{\rho^{centroid}(a_n)|L_A^{(E)}(a_n)\}$ estimates a transmitted signal.

19. The receiver of claim 16, wherein the received input signal is received from a satellite transponder comprising an input multiplexing (IMUX) filter and output multiplexing (QMUX) filter, and wherein the linear equalizer compensates for a group delay resulting from the IMUX filter and OMUX filter.

20. A method, comprising:
downconverting an input signal received at a partial response signaling receiver, wherein the partial response signaling receiver receives the input signal from a satellite transponder;
filtering the downconverted signal using a partial response filter of the receiver with a partial response impulse function;
downsampling the partial response filtered signal using a downsampler of the receiver;
equalizing the downsampled signal using a linear equalizer of the receiver; and
removing linear inter-symbol interference (ISI) and non-linear ISI in the input signal,
wherein removing linear ISI and non-linear ISI in the input signal comprises using an interference estimate filter to estimate interference in the input signal by creating a polynomial representation of a nonlinear satellite system with memory.

* * * * *